United States Patent
DeVito et al.

(10) Patent No.: US 10,653,152 B2
(45) Date of Patent: May 19, 2020

(54) ADJUSTABLE THICKNESS SHEETING DEVICE FOR A FOOD PROCESSING DEVICE

(71) Applicant: WHIRLPOOL CORPORATION, Benton Harbor, MI (US)

(72) Inventors: Lucas B. DeVito, Byron Center, MI (US); Edward Haney, Baroda, MI (US); Sandip K. Kardile, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/522,840

(22) Filed: Jul. 26, 2019

(65) Prior Publication Data

US 2019/0343130 A1 Nov. 14, 2019

Related U.S. Application Data

(62) Division of application No. 15/381,647, filed on Dec. 16, 2016, now Pat. No. 10,433,559.

(Continued)

(51) Int. Cl.
| | |
|---|---|
| *A47J 43/07* | (2006.01) |
| *A21C 3/02* | (2006.01) |
| *A22C 17/00* | (2006.01) |
| *A47J 17/14* | (2006.01) |
| *A47J 17/16* | (2006.01) |
| *B26D 1/02* | (2006.01) |
| *B26D 1/03* | (2006.01) |
| *B26D 1/06* | (2006.01) |

(Continued)

(52) U.S. Cl.
CPC ............ *A21C 3/02* (2013.01); *A22C 17/0033* (2013.01); *A47J 17/14* (2013.01); *A47J 17/16* (2013.01); *A47J 43/07* (2013.01); *B26D 1/02* (2013.01); *B26D 1/03* (2013.01); *B26D 1/06* (2013.01); *B26D 3/11* (2013.01); *B26D 3/26* (2013.01); *B26D 3/28* (2013.01); *B26D 5/02* (2013.01); *B26D 5/083* (2013.01); *B26D 7/01* (2013.01); *B26D 7/02* (2013.01); *B26D 2001/006* (2013.01)

(58) Field of Classification Search
CPC combination set(s) only.
See application file for complete search history.

(56) References Cited

U.S. PATENT DOCUMENTS

| | | |
|---|---|---|
| 1,880,526 A | 10/1932 | Templeton |
| 1,966,186 A | 7/1934 | Remsnider |

(Continued)

*Primary Examiner* — James Sanders
(74) *Attorney, Agent, or Firm* — Price Heneveld LLP

(57) ABSTRACT

A food processing attachment for a food processing device includes a rotational adapter configured to be selectively coupled with a drive system of the food processing device. A food holder is coupled to the rotational adapter and having a base, wherein the food holder is selectively rotated by the rotational adapter. A central spear extends perpendicularly from a center of the base. A plurality of radial flanges extend perpendicularly from the base, wherein each radial flange of the plurality of flanges is discontinuous with the other radial flanges, wherein the central spear and the plurality of radial flanges are adapted to secure a food item in a processing space and in communication with the rotational adapter. A blade is coupled to an operable carriage and is adapted to selectively engage the food item within the processing space to remove at least a portion of the food item.

11 Claims, 15 Drawing Sheets

Related U.S. Application Data

(60) Provisional application No. 62/396,277, filed on Sep. 19, 2016.

(51) Int. Cl.
  *B26D 3/11* (2006.01)
  *B26D 3/26* (2006.01)
  *B26D 3/28* (2006.01)
  *B26D 5/02* (2006.01)
  *B26D 5/08* (2006.01)
  *B26D 7/01* (2006.01)
  *B26D 7/02* (2006.01)
  *B26D 1/00* (2006.01)

(56) References Cited

U.S. PATENT DOCUMENTS

| | | |
|---|---|---|
| 2,307,829 A | 1/1943 | Ellis |
| 2,410,683 A | 11/1946 | Marquez |
| 2,566,568 A | 9/1951 | Ives |
| 3,153,436 A | 10/1964 | Chesley |
| 3,881,406 A | 5/1975 | Perez |
| 3,952,621 A | 4/1976 | Chambos |
| 4,038,915 A | 8/1977 | Saito |
| 5,690,022 A | 11/1997 | Chai |
| 6,314,849 B1 | 11/2001 | Arrasmith |
| 6,484,627 B1 | 11/2002 | Peter |
| 6,523,464 B1 | 2/2003 | Widelo |
| 7,032,491 B2 | 4/2006 | Fischer |

ADJUSTABLE THICKNESS SHEETING DEVICE FOR A FOOD PROCESSING DEVICE

CROSS-REFERENCE TO RELATED APPLICATION

The present application is a divisional of U.S. patent application Ser. No. 15/381,647 filed Dec. 16, 2016, entitled ADJUSTABLE THICKNESS SHEETING DEVICE FOR A FOOD PROCESSING DEVICE, which claims priority to and the benefit under 35 U.S.C. § 119(e) of U.S. Provisional Patent Application No. 62/396,277 filed on Sep. 19, 2016, entitled ADJUSTABLE THICKNESS SHEETING DEVICE FOR A FOOD PROCESSING DEVICE, the entire disclosures of which are hereby incorporated herein by reference.

FIELD OF THE DEVICE

The device is in the field of food processing devices, and more specifically, an adjustable thickness sheeting device attachment that can be used in conjunction with a food processing device.

SUMMARY

In at least one aspect, a food processing attachment for a food processing device includes a rotational adapter configured to be selectively coupled with a drive system of the food processing device. A food holder is coupled to the rotational adapter and having a base, wherein the food holder is selectively rotated by the rotational adapter. A central spear extends perpendicularly from a center of the base. A plurality of radial flanges extend perpendicularly from the base, wherein each radial flange of the plurality of radial flanges is discontinuous with the other radial flanges, wherein the central spear and the plurality of radial flanges are adapted to secure a food item in a processing space and in communication with the rotational adapter. A blade is coupled to an operable carriage and is adapted to selectively engage the food item within the processing space to remove at least a portion of the food item.

In at least another aspect, a food processing attachment for a food processing device includes a rotational adapter configured to be selectively coupled with a drive system of the food processing device. A food holder is selectively rotated by the rotational adapter. A plurality of radial flanges extend perpendicularly from the food holder, each radial flange of the plurality of radial flanges being discontinuous with the other radial flanges. A blade is coupled to an operable carriage and is adapted to selectively move through a processing space defined proximate the food holder.

In at least another aspect, a food processing attachment for a food processing device includes a rotational adapter configured to be selectively coupled with a drive system of the food processing device. A food holder is selectively rotated by the rotational adapter to define a processing space. A plurality of radial flanges extend perpendicularly from the food holder, each radial flange of the plurality of radial flanges being discontinuous with the other radial flanges. A blade is coupled to an operable carriage. The blade is adapted to selectively move through a processing space defined proximate the food holder. The blade is biased by the operable carriage toward the processing space. The blade is operable from a rest position distal from the processing space, an initial cutting position defined by the blade entering into the processing space, and a stopping position defined by the carriage engaging a portion of the food holder, wherein the stopping position prevents further movement of the blade through the processing space.

These and other features, advantages, and objects of the present device will be further understood and appreciated by those skilled in the art upon studying the following specification, claims, and appended drawings.

DETAILED DESCRIPTION OF EMBODIMENTS

Figure 1:
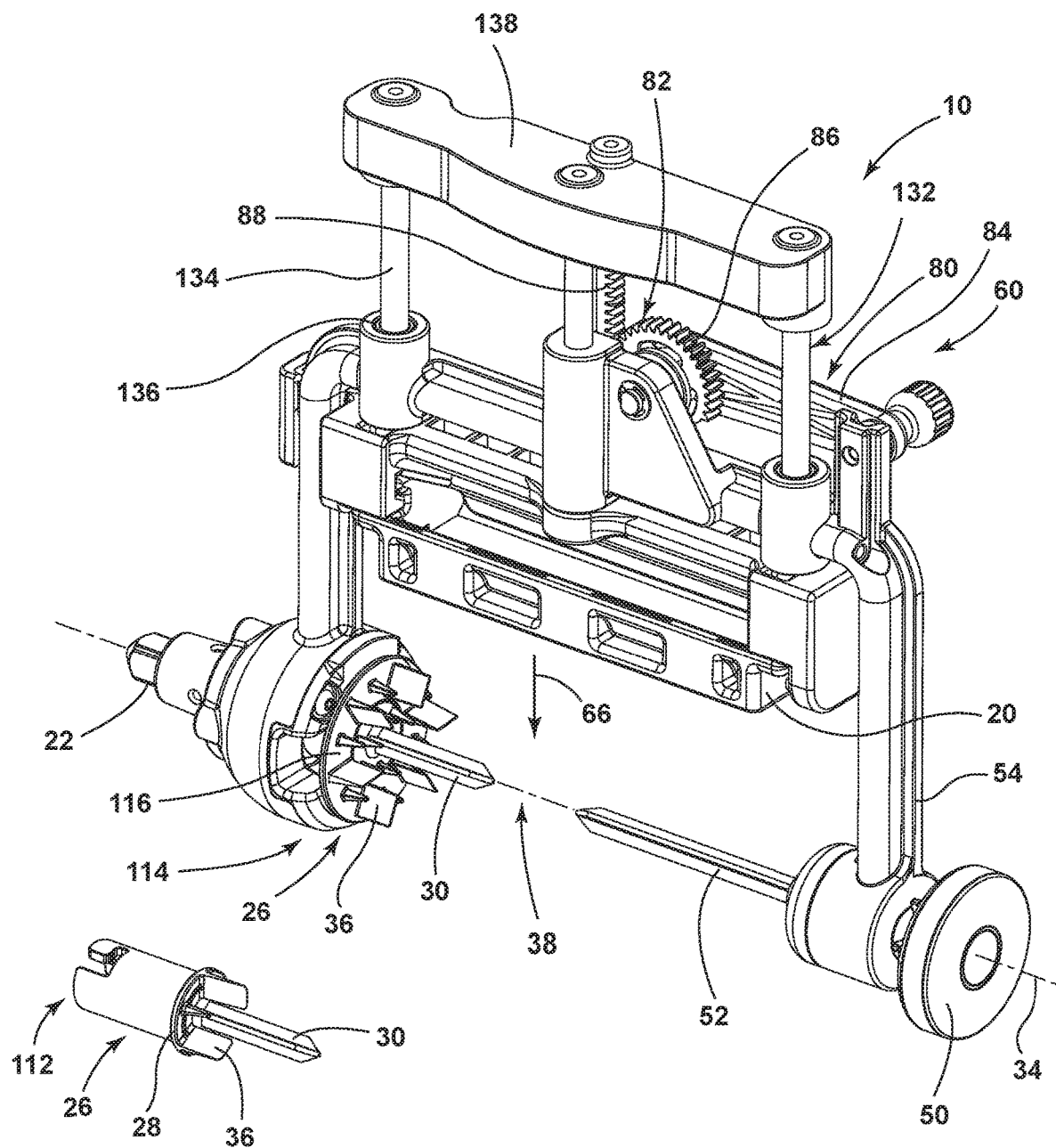
FIG. 1 is a top perspective view of an aspect of the sheeting attachment shown in a rest position.
Figure 2:
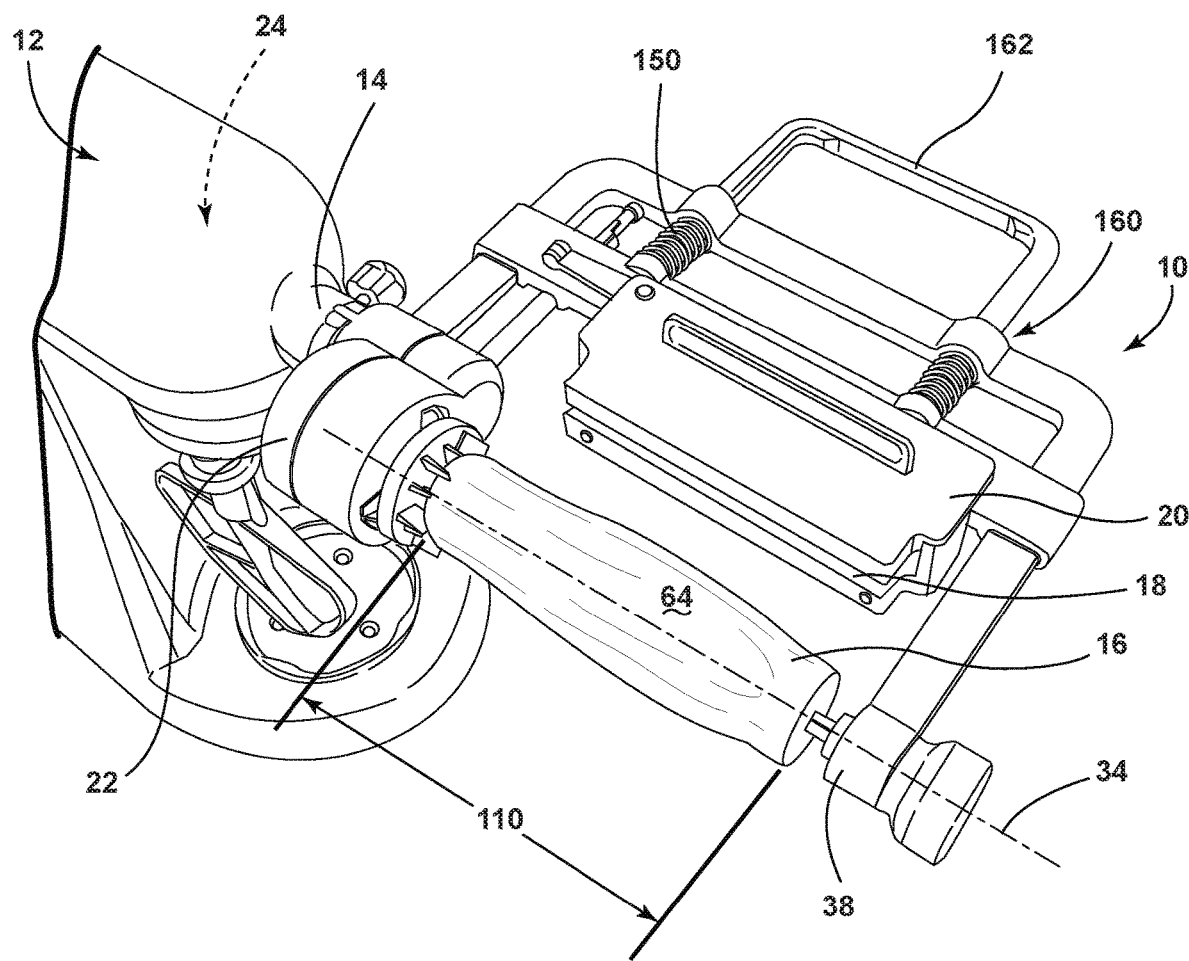
FIG. 2 is a top perspective view of an aspect of the sheeting attachment shown in the rest position and attached to a food processing device.
Figure 3:
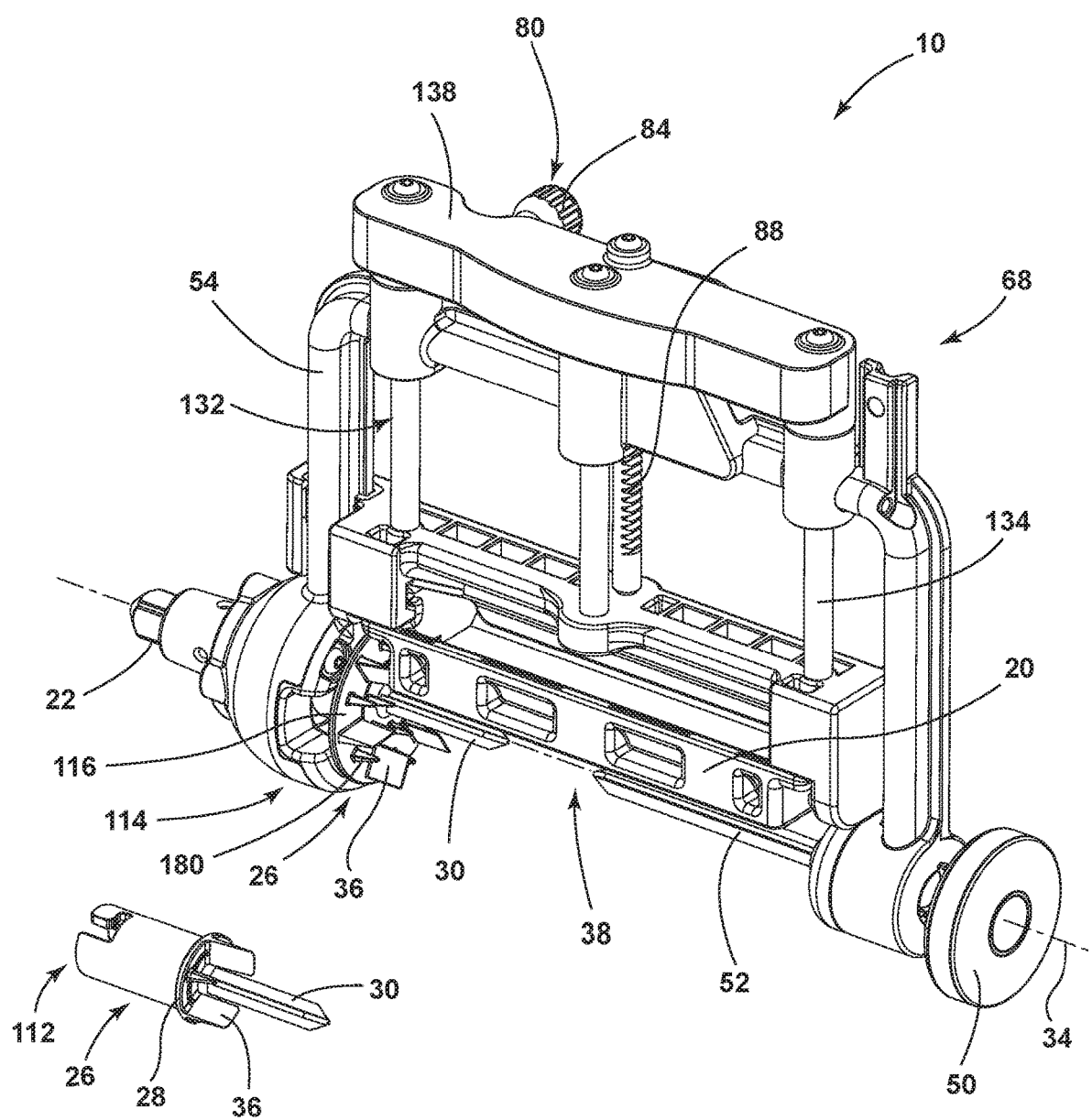
FIG. 3 is a top perspective view of the sheeting attachment of FIG. 1 showing the sheeting attachment in a stopping position.
Figure 4:
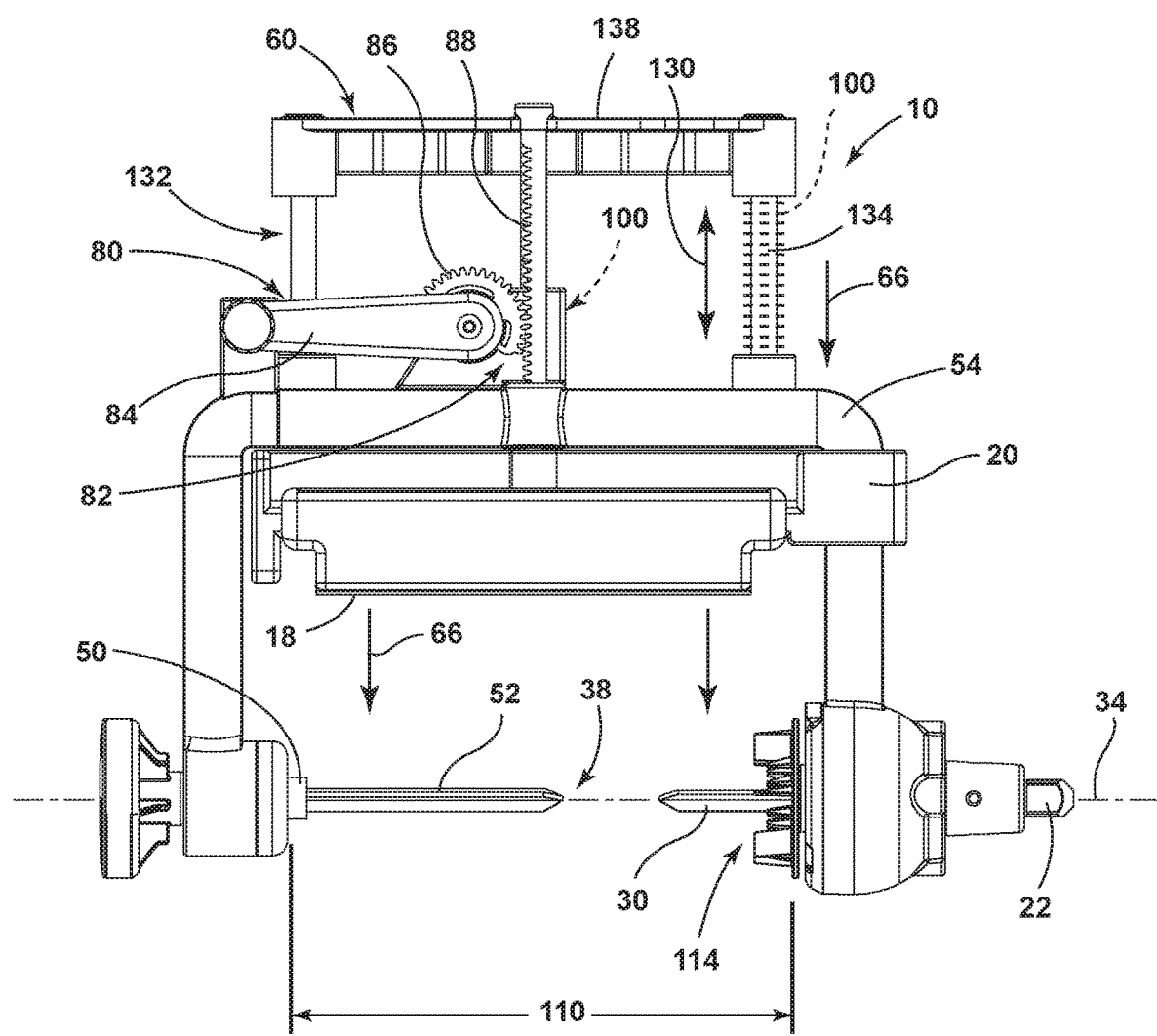
FIG. 4 is a front elevational view of the sheeting attachment of FIG. 1.
Figure 5:
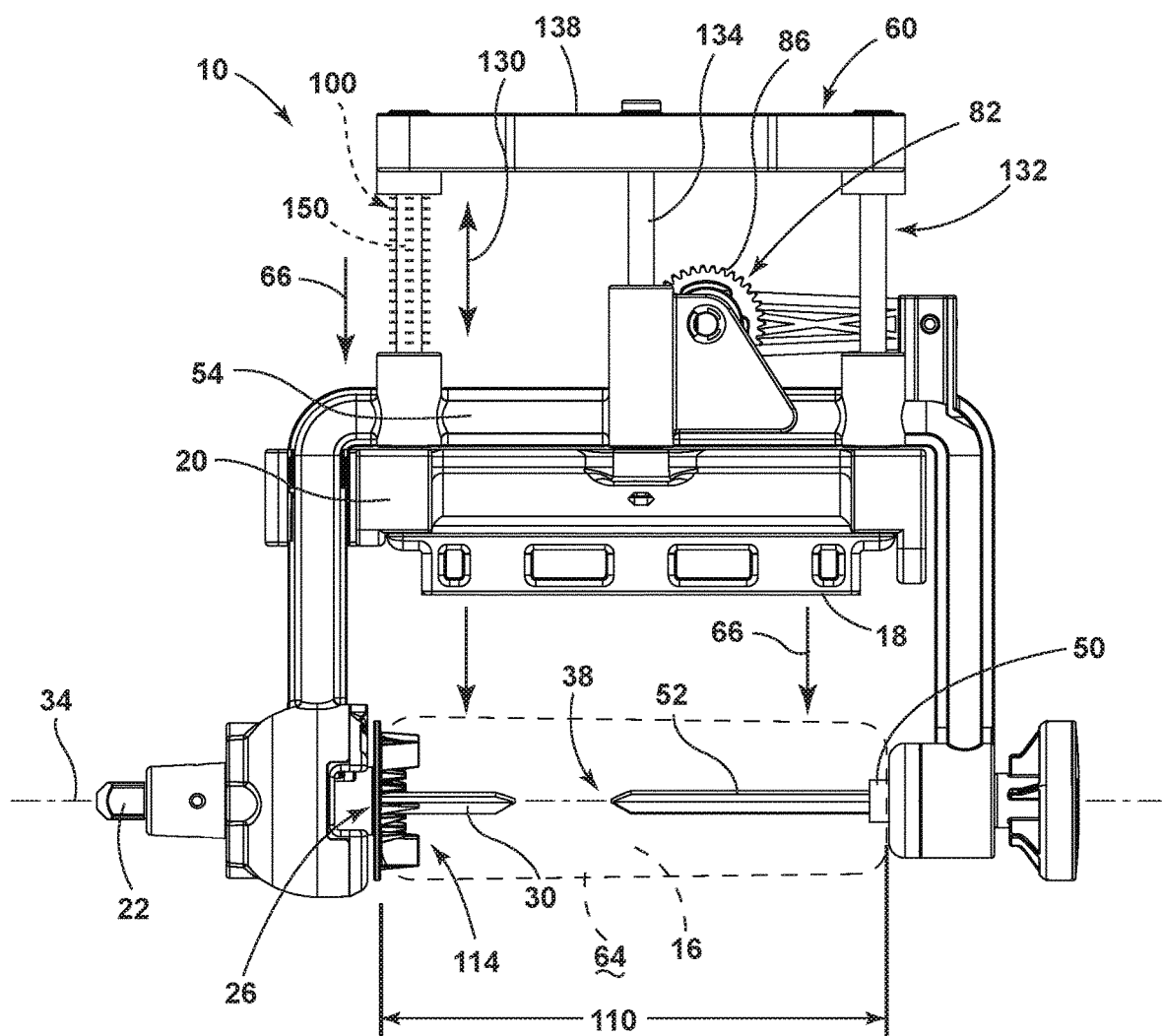
FIG. 5 is an opposing side elevational view of the sheeting attachment of FIG. 4.
Figure 6:
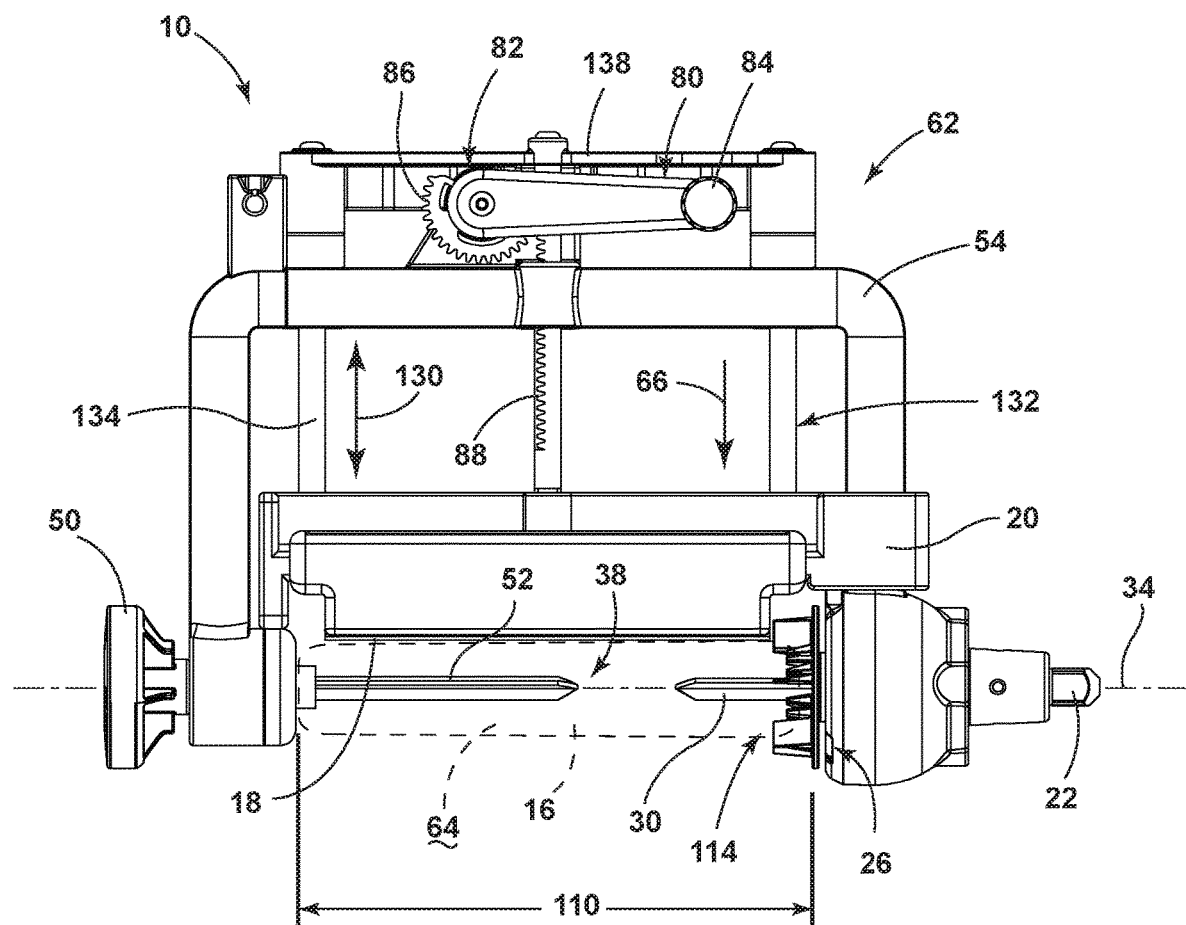
FIG. 6 is a front elevational view of the sheeting attachment of FIG. 3 with the sheeting attachment shown proximate the stopping position indicative of the initial cutting position.
Figure 7:
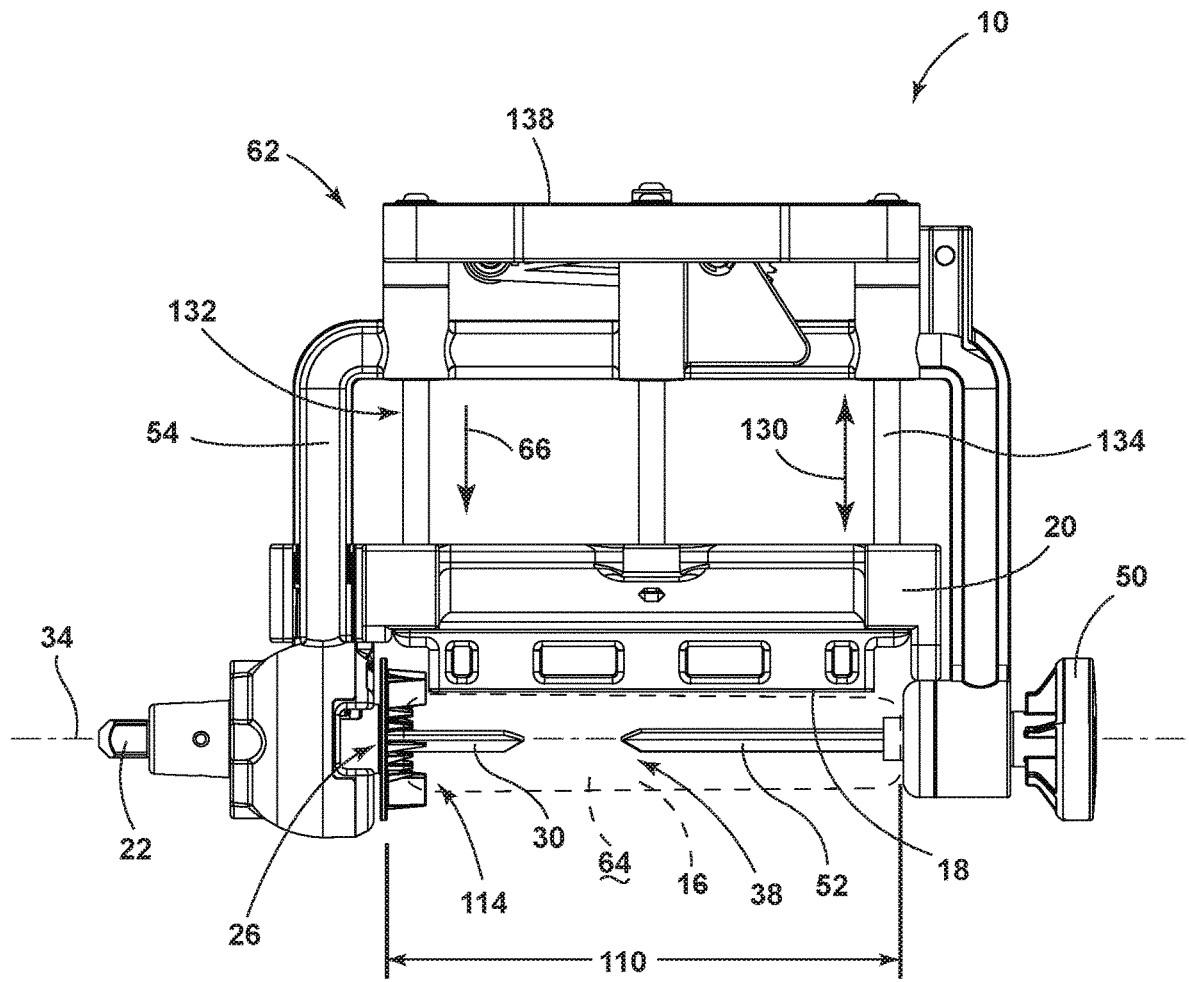
FIG. 7 is a rear elevational view of the sheeting attachment of FIG. 6.
Figure 8:
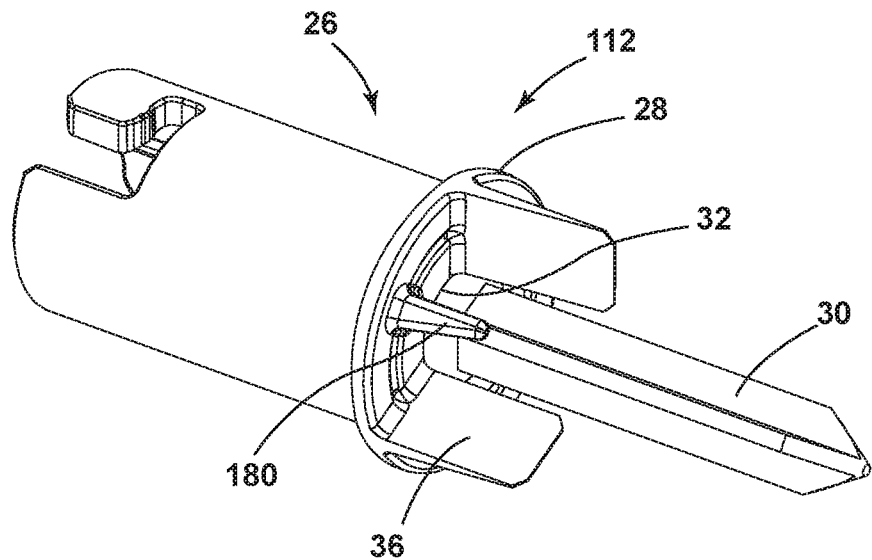
FIG. 8 is a perspective view of a hard food holder used in conjunction with the sheeting attachment.
Figure 9:
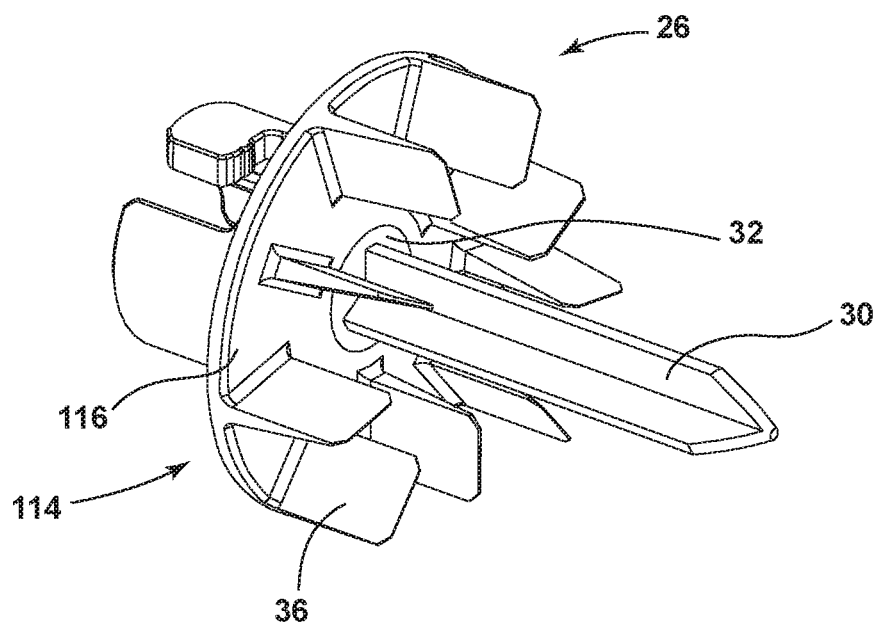
FIG. 9 is a perspective view of a soft-food holder that can be used in conjunction with the sheeting attachment.
Figure 10:
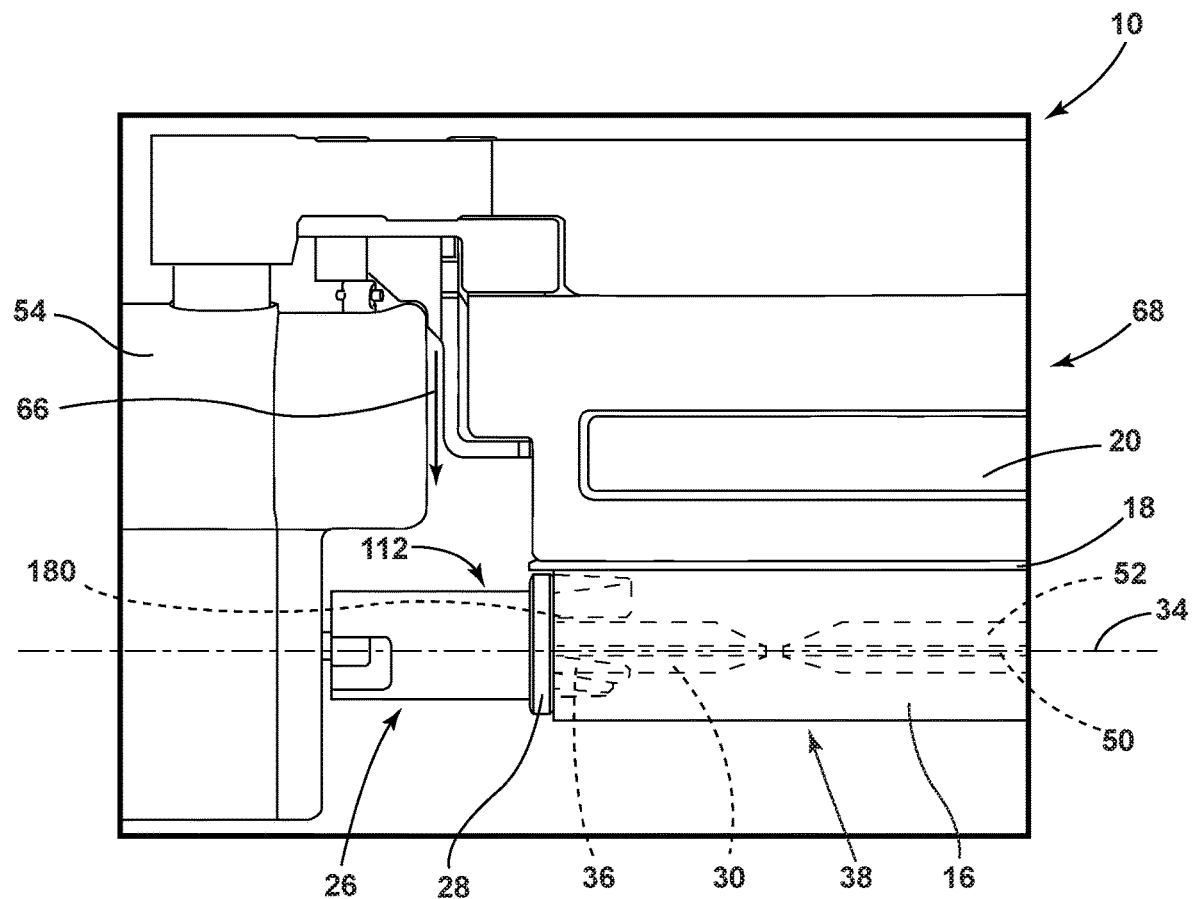
FIG. 10 is a detailed elevational view of the sheeting attachment with the hard food holder installed thereon and the sheeting attachment positioned in the stopping position.
Figure 11:
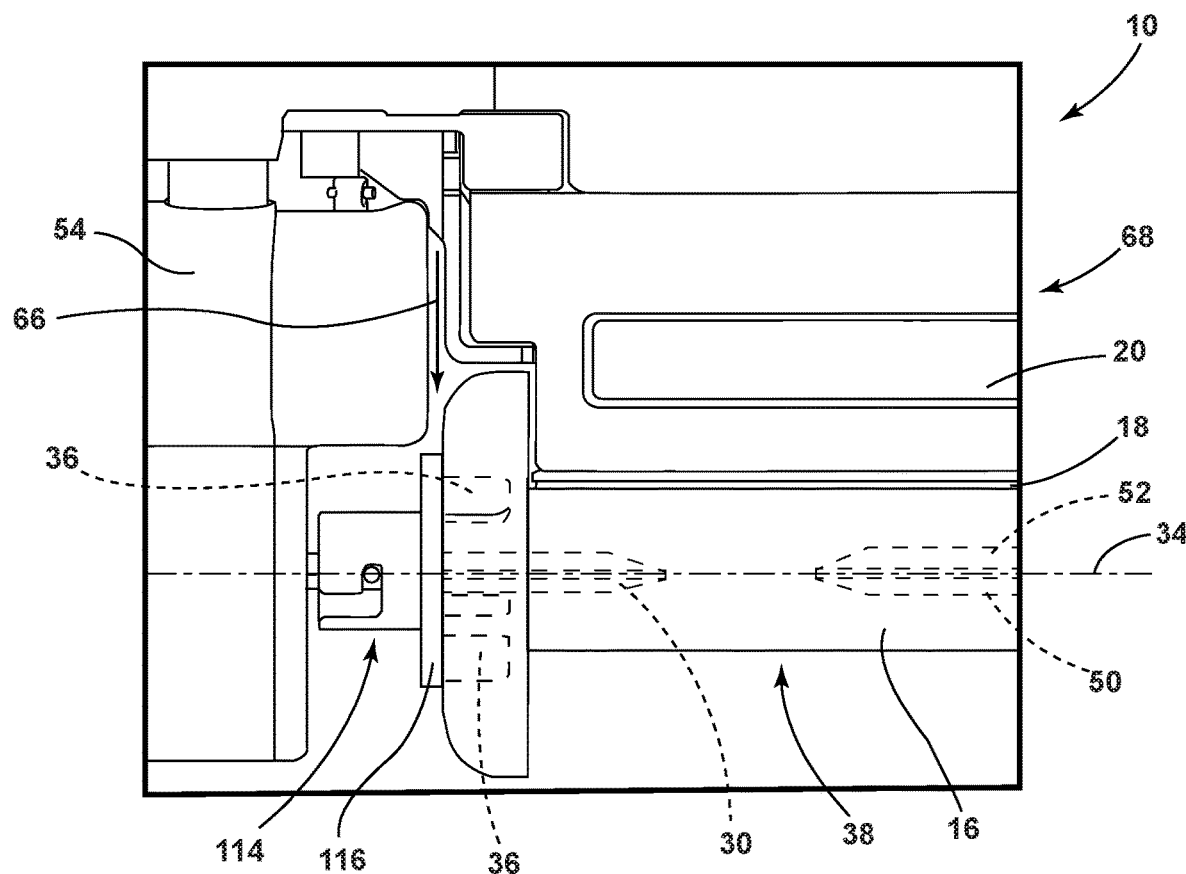
FIG. 11 is a detailed elevational view of the sheeting attachment showing the soft-food holder installed thereon and the blade in the initial cutting position and moving toward the stopping position.
Figure 12:
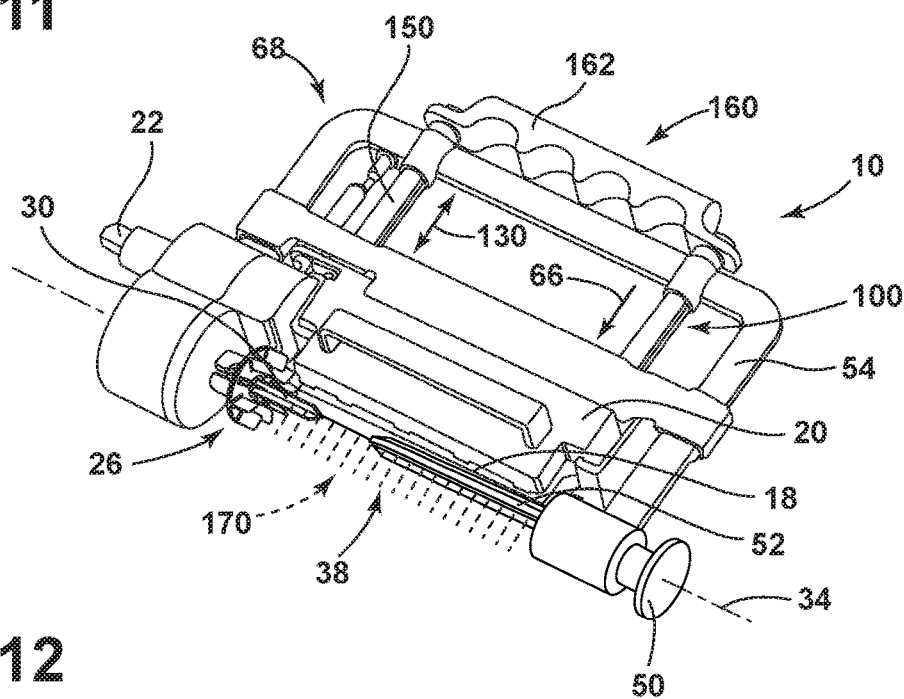
FIG. 12 is a top perspective view of an aspect of a sheeting device with the soft-food holder installed thereon and the carriage in the stopping position.
Figure 13:
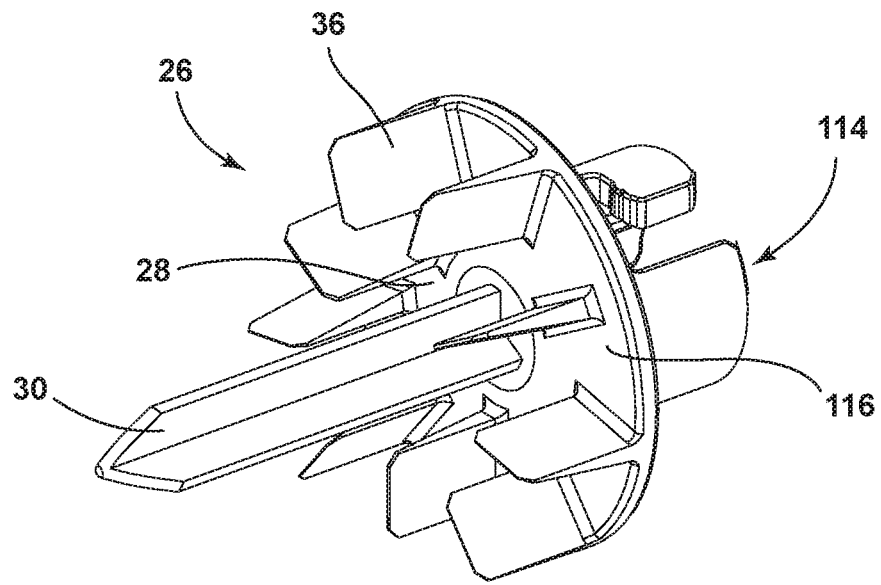
FIG. 13 is an enlarged perspective view of the soft-food holder of FIG. 8.
Figure 14:
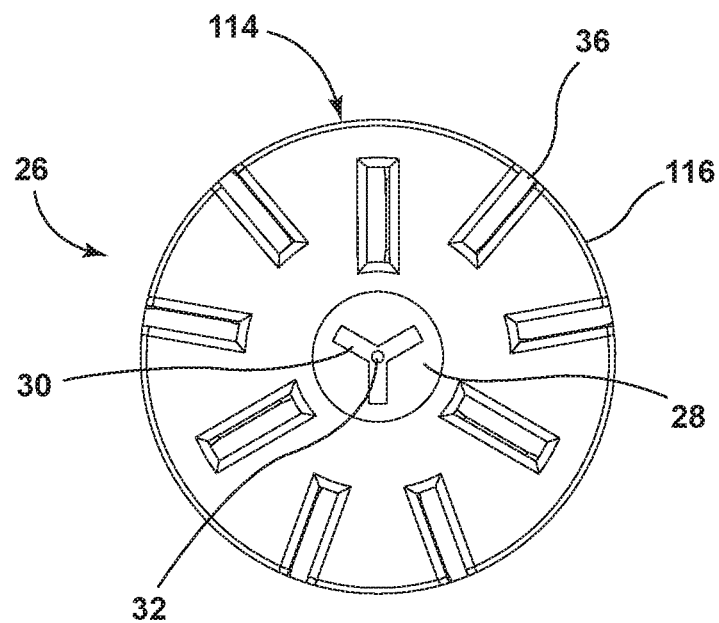
FIG. 14 is an elevational view of the soft-food holder of FIG. 13.
Figure 15:
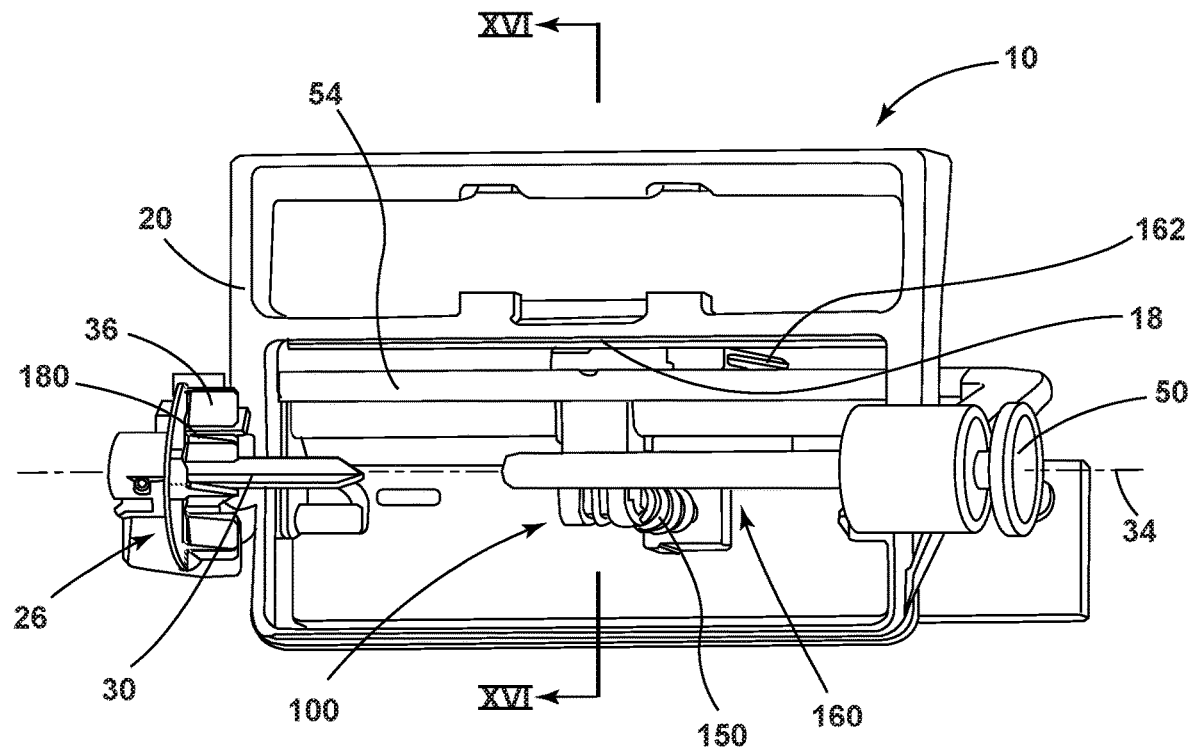
FIG. 15 is a perspective view of an alternate aspect of the sheeting attachment showing an alternative aspect of the biasing mechanism.
Figure 16:
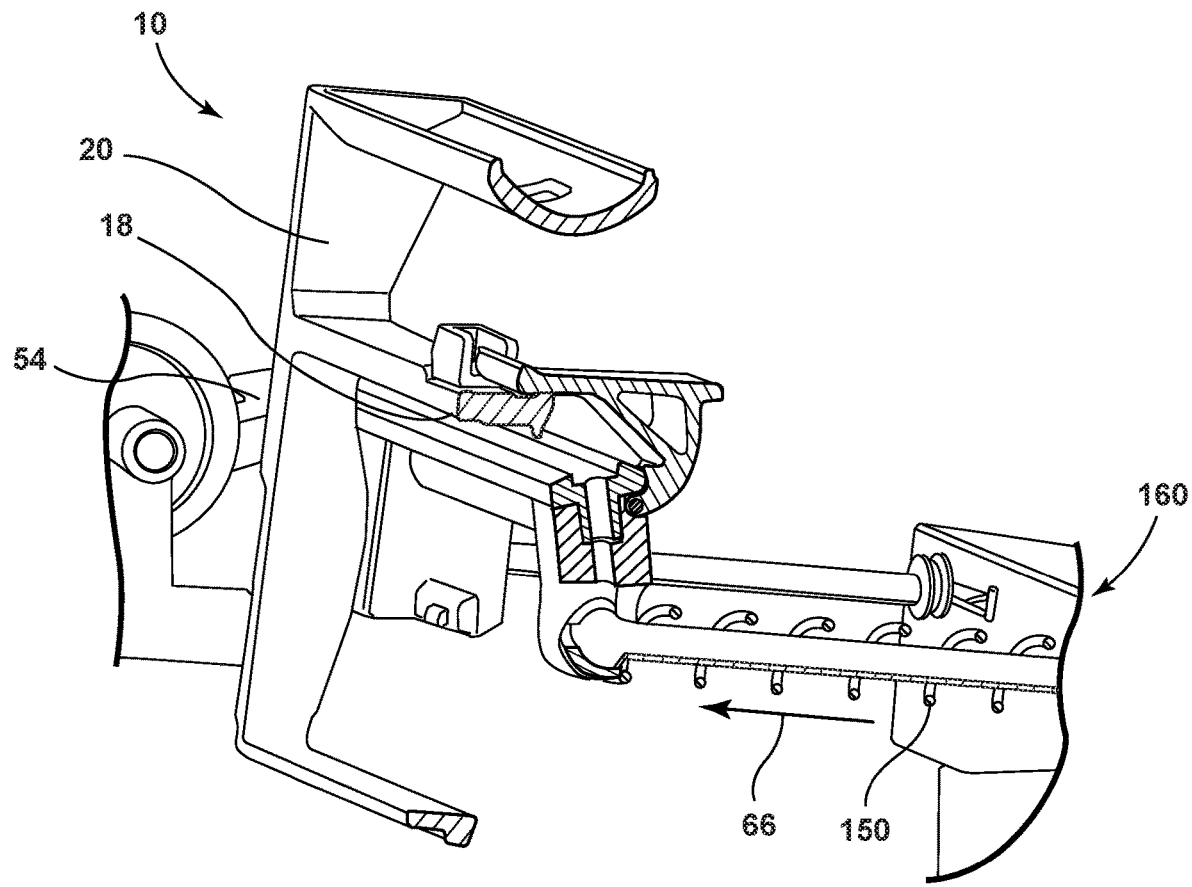
FIG. 16 is a perspective cross-sectional view of the sheeting attachment of FIG. 15, taken along line XVI-XVI.
Figure 17:
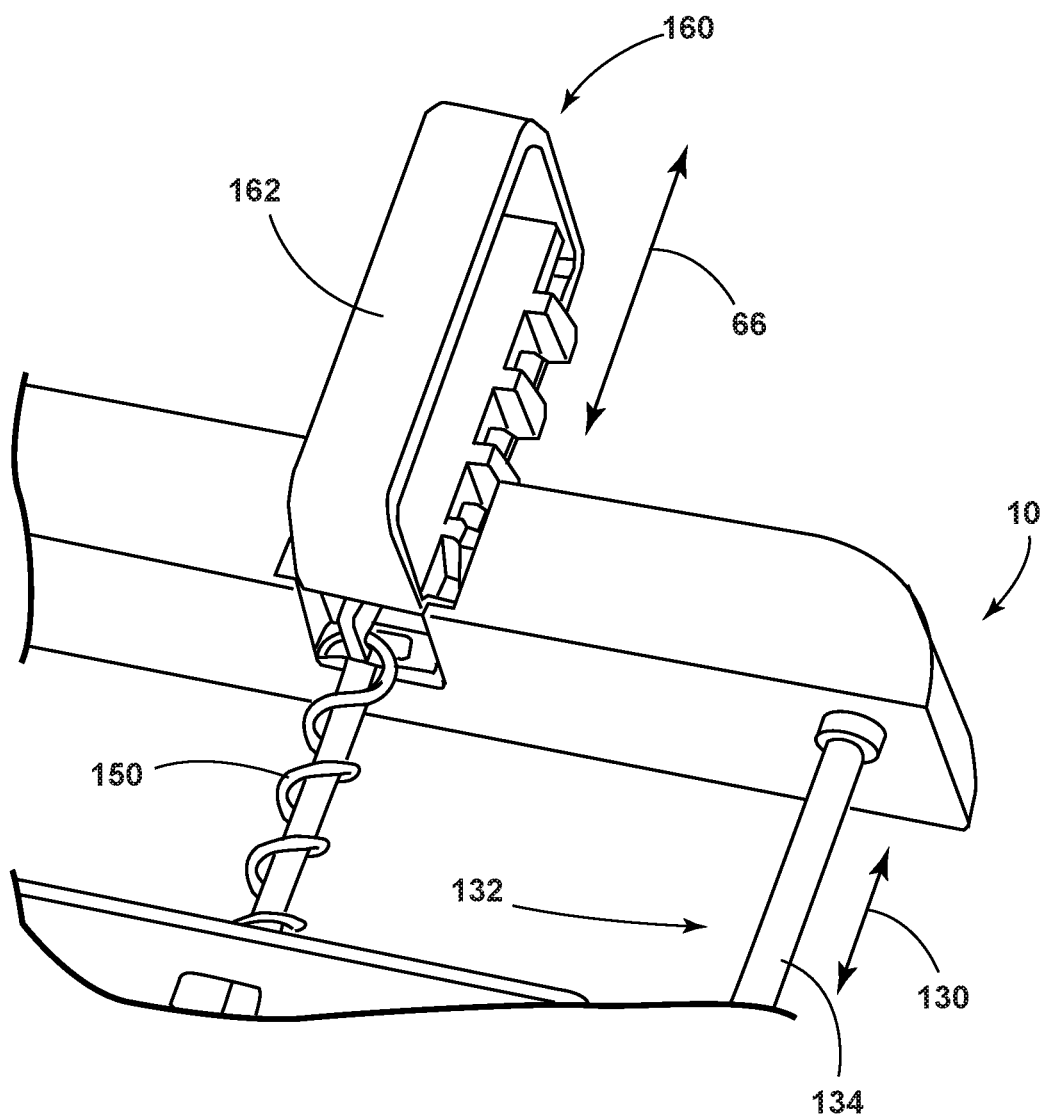
FIG. 17 is a perspective view of a user interface for operating the biasing mechanism of an aspect of the sheeting attachment.
Figure 18:
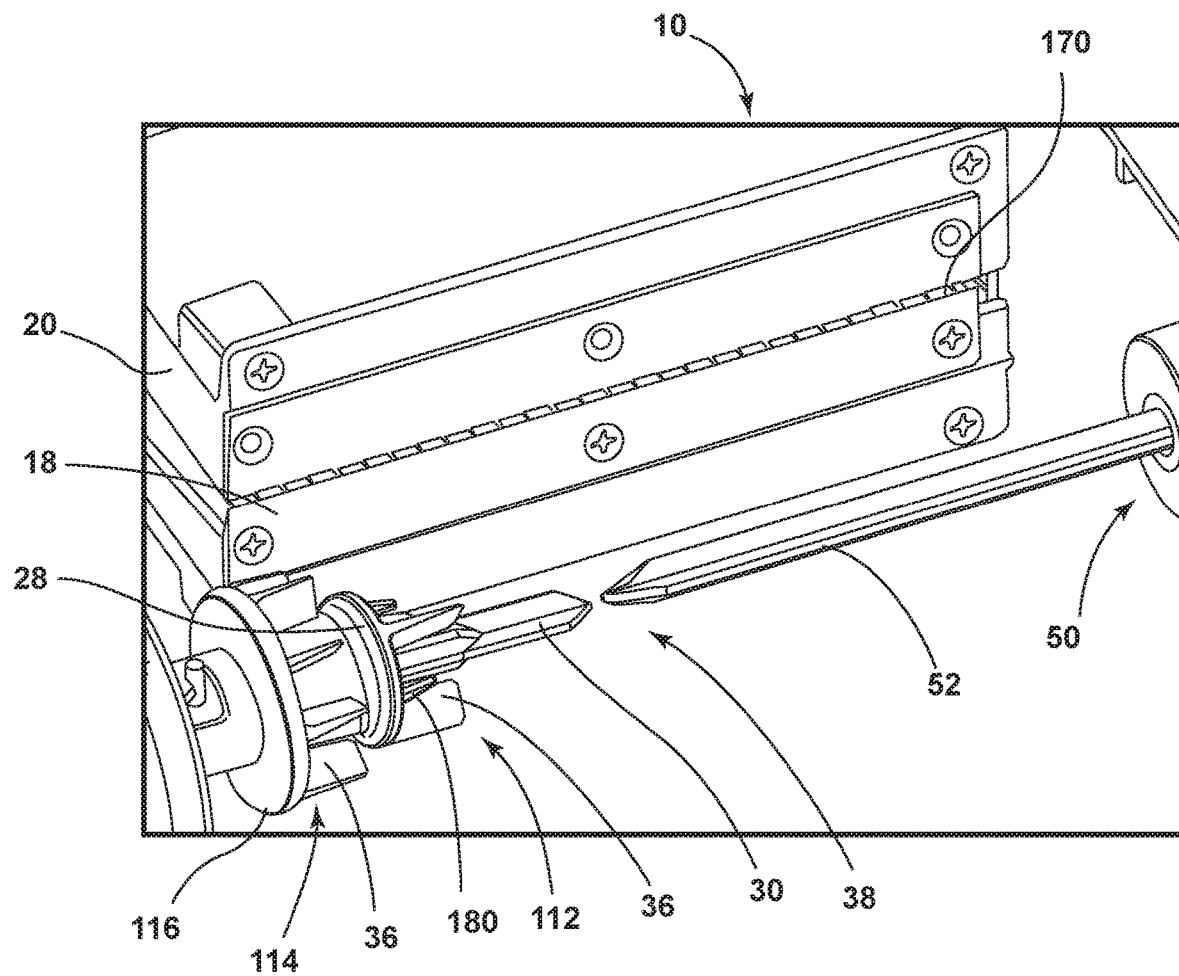
FIG. 18 is a perspective view of an aspect of the sheeting attachment incorporating a supplemental blade.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-11, reference numeral 10 generally refers to a sheeting attachment that can be used in conjunction with a food processing device 12 or similar appliance, where a rotational apparatus 14 of the food processing device 12 rotates a portion of the sheeting attachment 10 to rotate a food item 16 that can be cut with a blade 18 set upon an operable carriage 20 that is biased toward the food item 16. According to the various embodiments, the food processing attachment, in the form of the sheeting attachment 10, includes a rotational adapter 22 that is configured to be selectively coupled with a drive system 24 of the food processing device 12. A food holder 26 is selectively coupled to the rotational adapter 22 and includes a base 28 that connects to the rotational adapter 22. It is contemplated that the food holder 26 is selectively rotated by the rotational adapter 22 upon activation of the drive system 24 of the food processing device 12. A central spear 30 extends perpendicularly from a center 32 of the base 28. It is contemplated that the central spear 30 extends along the rotational axis 34 of the rotational adapter 22. Alternatively, it is contemplated that the central spear 30 can be disposed off-center in various aspects of the device.

Referring again to FIGS. 1-12, a plurality of radial flanges 36 extend perpendicularly from the base 28. It is contemplated that each radial flange 36 of the plurality of radial flanges 36 is discontinuous with the other radial flanges 36. In this manner, each radial flange 36 extends individually from the base 28 for retaining the food item 16 thereon. It is also contemplated that the central spear 30 and the plurality of radial flanges 36 are adapted to secure the food item 16 within a processing space 38 of the sheeting attachment 10 and in communication with the rotational adapter 22. Accordingly, upon activation of the drive system 24, the drive system 24 of the food processing device 12 rotates the rotational adapter 22 and, in turn, rotates the food holder 26 and the food item 16 attached thereon.

Referring again to FIGS. 1-12, the food holder 26 is adapted to secure the food item 16 within the processing space 38. A food guide 50 of the sheeting attachment 10 can include an elongated spear 52 that opposes the central spear 30 and the plurality of radial flanges 36 in the food holder 26. In this manner, the food guide 50 is typically in an axially fixed and rotational relationship on a portion of the frame 54 of the sheeting attachment 10. The food guide 50 can also be removable for cleaning and replacement. The food holder 26 can include a set of food holders 26 that can be removed from the rotational adapter 22 and replaced from the rotational adapter 22 based upon the food item 16 being processed by the sheeting attachment 10. According to the various embodiments, the elongated spear 52 of the food guide 50 is typically operated as a support for holding the food item 16 within the processing space 38. The food holder 26, while also serving to hold the food item 16 in the processing space 38, also has additional rotational gripping functions that hold the food item 16 in the processing space 38 and also substantially prevents unwanted slipping, shredding or other unwanted deformation of the food item 16 during use of the sheeting attachment 10. To assist in this gripping function, the food guide 50 can include a holding fork, integral flanges, supplemental spears or other food holding mechanisms that can assist the food guide 50 in securing a food item 16 in the processing space 38. These food holding mechanisms are typically incorporated during the processing of softer food items 16, and food items 16 that may have a tendency to flake off or break up during processing.

Referring now to FIGS. 8-14, the plurality of radial flanges 36 extend from the base 28 and can be adapted to extend in an non-perpendicular orientation from the base 28. In such an embodiment, radial flanges 36 can be configured to extend at a non-predetermined angle from the base 28 to provide additional gripping functions for holding the food item 16 within the food processing space 38. In such an embodiment, the food holder 26 can be inserted into the food item 16 such that an at least partial rotation of the food holder 26 is necessary to insert the radial flanges 36 within the food item 16. The slight angle of the radial flanges 36 necessitates this at least partial rotation of the food holder 26 as it inserts into the food item 16. It is contemplated that the angle that the radial flanges 36 are set at is toward the direction of rotation of the rotational adapter 22 during use of the sheeting attachment 10. Accordingly, the engagement of the food holder 26 with the food item 16 can define a more secure engagement, such that the food item 16 is biased toward the base 28 and is prevented from slipping off of the food holder 26 during use of the sheeting attachment 10.

Referring again to FIGS. 1-14, the blade 18 of the sheeting attachment 10 is coupled to an operable carriage 20. The blade 18 is adapted to selectively engage the food item 16 within the processing space 38 to remove at least a portion of the food item 16. The portion of the food item 16 removed is indicative of a desired food processing manipulation, where such manipulation can take the form of sheeting, shredding, slicing, and other similar operation that involves a cutting operation performed on the food item 16 during operation of the sheeting attachment 10. The blade 18 is further adapted to be laterally biased by the operable carriage 20 toward the food holder 26 and the food guide 50. The blade 18 is operable from a rest position 60 that is distal from the food item 16, where the rest position 60 can be indicative of a fully extended position that allows for easy insertion and removal of a food item 16 that is to be or has been processed. The blade 18 is also operable to an initial cutting position 62 defined by the blade 18 engaging the outer surface 64 of the food item 16. During operation of the sheeting attachment 10, a biasing force 66 moves the blade 18 from the outer surface 64 of the food item 16 towards an inner part of the food item 16 to define a stopping position 68. The stopping position 68 of the blade 18 is defined by the carriage 20 engaging a portion of the food holder 26. The stopping position 68 serves to prevent further processing of the food item 16 by the blade 18 when the blade 18 engages a portion of the food holder 26. It is contemplated that the stopping position 68 can be defined by a portion of the carriage 20 engaging the food holder 26, rather than the blade 18, to prevent unnecessary damage to the blade 18 and/or food holder 26 during operation of the sheeting attachment 10.

In order to move the operable carriage 20 from the rest position 60 to the initial cutting position 62, the sheeting attachment 10 can include a user interface 80 that is operated by the user for manually manipulating the carriage 20 and the blade 18 for proper positioning during use or after use. According to the various embodiments, the user interface 80 can be in the form of a rack-and-pinion mechanism 82 that slidably operates the carriage 20 in a direction perpendicular to the central spear 30. The user can rotate a handle 84 rotationally attached to the frame 54 that operates a gear or pinion gear 86 that rotates in relation to a rack gear 88 to manipulate the position of the carriage 20 with respect to the food item 16. It is contemplated that other user interfaces 80 can be used to alter the position of the carriage 20 and the blade 18 from the rest position 60 to the initial cutting position 62 and from the stopping position 68 back to the rest position 60. Such user interfaces 80 can include, but are not limited to, levers, slides, knobs, screw-type drives, motorized mechanisms, hydraulic mechanisms, pneumatic mechanisms, ratcheting-type mechanisms, spring-loaded mechanisms, combinations thereof and other similar mechanisms that can serve to position the carriage 20 with respect to a food item 16.

Referring now to FIGS. 1-11, the carriage 20 and blade 18 are operated from the initial cutting position 62 to the stopping position 68 through application of a substantially consistent biasing force 66 exerted on the carriage 20. This substantially consistent biasing force 66 can be in a range from approximately four pounds of force to approximately six pounds of force applied toward the food item 16 and in a direction perpendicular to the central spear 30 and elongated spear 52 of the food holder 26 and food guide 50, respectively. This biasing force 66 can be applied by various biasing mechanisms 100 that can include, but are not limited to, spring mechanisms, elastic mechanisms, constant force springs, a low-rate spring, and other similar biasing mechanisms 100.

Referring again to FIGS. 1-11, during operation of the sheeting attachment 10, the food item 16 can be entirely disposed between the food holder 26 and the food guide 50. In such an embodiment, the blade 18 is positioned relative to the food holder 26, such that the blade 18 and/or the carriage 20 engage a portion of the base 28 to define the stopping position 68. In this manner, the blade 18 is adapted to be longer than the food item 16, such that the blade 18 is adapted to process the entire length 110 of the food item 16 during use of the sheeting attachment 10. This configuration of the carriage 20 engaging the base 28 is indicative of a hard food holder 112 that has a smaller diameter that allows for a minimal securing surface between the hard food holder 112 and the food item 16. This engagement also provides for a maximum amount of food processing capability as the blade 18 acts upon the food item 16. It is contemplated that the radial flanges 36 of the hard food holder 112 are positioned substantially near the central spear 30 such that the engagement between the hard food holder 112 and the food item 16 is within a relatively small surface area.

The plurality of food holders 26 can also include a soft-food holder 114. The soft foot holder 114 includes a shield 116 that extends outward from the base 28. This can be indicative of a larger base 28 where the shield 116 is simply an extension of the base 28 and is coplanar with the base 28. It is contemplated that the central spear 30 extends from a center 32 of the shield 116. The plurality of radial flanges 36 extend outward from a portion of the shield 116 and are set further away from the center 32 of the shield 116 to define a greater radial distance than that of the radial flanges 36 of the hard food holder 112. Accordingly, it is contemplated that the soft-food holder 114 is adapted to engage a larger surface area of the corresponding food item 16 than that of a hard food holder 112. In this manner, the larger surface engagement between the soft-food holder 114 and the food item 16 allows for greater surface engagement to limit the amount of food shredding, slipping or other unwanted deformation of the food item 16 that may occur with softer food items 16, such as pears, peaches, zucchini, and other similar soft fruits and vegetables, as well as soft cheeses and meats.

It is further contemplated that when a soft food item 16 is positioned between the soft-food holder 114 and the food guide 50, the blade 18 is positioned relative to the soft-food holders 114 such that the stopping position 68 of the blade 18 is defined by the blade 18 bypassing the plurality of flanges of the soft-food holder 114 and engaging the central spear 30 of the soft-food holder 114. Accordingly, the soft-food holder 114 has a shorter length 110 than that of the hard food holder 112 such that the processing space 38 is wider to allow the blade 18 to bypass the radial flanges 36. During processing of a soft food item 16, an outer edge of the soft food item 16 will typically not be processed, resulting in a "mushroom cap." However, this area of unprocessed food serves to rotationally engage the larger surface area of the soft-food holder 114 to prevent shredding and unwanted deformation of the food during processing within the processing space 38. Accordingly, during use of both the hard food holder 112 and soft-food holder 114, the central spear 30 and the radial flanges 36 maintain engagement with the food item 16 during use of the sheeting attachment 10. Additionally, the positioning of the blade 18 relative to the soft and hard food holders 114, 112 allows for continual engagement of the central spear 30 and radial flanges 36 with the food item 16 during processing.

Referring again to FIGS. 1-12, the carriage 20 and blade 18 are guided along a linear path 130 between the rest, initial cutting and stopping positions 60, 62, 68 by a linear guide 132. It is contemplated that the linear guide 132 is adapted to prevent movement of the carriage 20 away from the linear path 130 along which the carriage 20 operates. This linear guide 132 can be defined by at least one guide shaft 134 that extends through a corresponding aperture 136 defined within the frame 54 of the sheeting attachment 10. In this manner, the guide shaft 134 extends from the carriage 20 to a guide plate 138, where the carriage 20 and guide plate 138 are set at a predetermined distance relative to one another. In such an embodiment, the rest position 60 can be defined by the carriage 20 moving away from the food item 16 and engaging a portion of the frame 54. It is further contemplated that the stopping position 68 can also be defined by the guide plate 138 engaging the frame 54 to define a certain distance between the carriage 20 and the central spear 30 of either the soft or hard food holders 114, 112. It is contemplated that the linear guide 132 can include a plurality of guide shafts 134, such as three guide shafts 134 that extend through apertures 136 defined within the frame 54 that extend between the carriage 20 and the guide plate 138. It is further contemplated that the rack gear 88 can also extend between the carriage 20 and guide plate 138 where the user interface 80 attaches a frame 54. Operation of the user interface 80 serves to rotate the pinion gear 86 and laterally moves the rack gear 88 to position the carriage 20 with respect to the food item 16.

According to the various embodiments, it is contemplated that differing tension or differing amounts of biasing force 66 can be set by manipulating the distance between the carriage 20 and the guide plate 138. In such an embodiment, the guide plate 138 can be moved toward the carriage 20. As a result of this movement, a spring 150 is at least partially compressed to increase the amount of biasing force 66 that may be exerted upon the food item 16 during use of the sheeting attachment 10. It is contemplated that other forms of adjustment of the biasing force 66 can be included within the sheeting attachment 10 for manipulating the amount of biasing force 66 exerted upon a particular food item 16. It is contemplated that a greater biasing force 66 exerted on the food item 16 may result in a thicker or deeper cut of the food item 16 that produces a thicker sheet of the food item 16. It is also contemplated that the biasing force 66 can be adjusted with respect to the carriage 20 to modify the cutting depth of the blade 18 with respect to the food item 16 or to more efficiently cut harder or softer food items 16.

Referring again to FIGS. 1-17, it is contemplated that a tension setting mechanism 160 can be manipulated by the user to adjust the biasing force 66 exerted upon the food item 16 during use of the sheeting attachment 10. The tension setting mechanism 160 can be in the form of an adjustment handle 162 that operates in a direction parallel with the biasing mechanism 100. By way of example, and not limitation, where the biasing mechanism 100 is a coil spring 150, the tension setting mechanism 160 can be manipulated to shorten the length 110 of the spring 150 and provide a greater biasing force 66 against the food item 16. The tension setting mechanism 160 can also be moved away from the food item 16 to decrease the amount of biasing force 66 exerted on the food item 16.

Referring again to FIGS. 1-18, the blade 18 for the sheeting attachment 10 can include a planing blade 18 that processes the food item 16 into one or more sheets of a substantially consistent thickness. As described above, the blade 18 can include other processing functions that can vary depending upon the needs of the user. Additionally, it is contemplated that the sheeting attachment 10 can include a supplemental blade 170 that is positioned proximate the carriage 20. In such an embodiment, the supplemental blade 170 can be adapted to pre-score the food item 16 before the food item 16 is processed by the blade 18 into one or more sheets. In such an embodiment, when the blade 18 processes the pre-scored food item 16, the scoring from the supplemental blade 170 is manifested as smaller strips of the processed food item 16. It is also contemplated that the supplemental blade 170 can be adapted to further process the food item 16 after it has been formed into one or more sheets. By way of example, and not limitation, the supplemental blade 170 can include a plurality of cutting fingers that serve to separate the food sheet into a plurality of elongated food strips. Such a function may be desired where the sheeting attachment 10 cuts a sheet of a particular food item 16 and the plurality of cutting fingers then cuts that sheet into strips of vegetable or pasta, such as linguini, spaghetti, or other elongated food item 16.

Other supplemental blades 170 can include cutting blades, slicing blades, chopping blades and other similar cutting mechanisms that can perform a secondary cutting operation after the primary blade 18 processes the food item 16 within the processing space 38.

Referring again to FIGS. 1-9, it is contemplated that the soft-food holder 114 and/or the hard food holder 112 can include a plurality of supporting tines 180 that extend outward from the shield 116 or base 28. In such an embodiment, it is contemplated that the plurality of supporting tines 180 are alternatively positioned between the plurality of radial flanges 36. Additionally, the plurality of supporting tines 180 is typically shorter than the plurality of radial flanges 36, where the supporting tines 180 can be included to add additional retaining force to the engagement between the food holder 26 and the food item 16 being processed.

According to the various embodiments, it is contemplated that the sheeting attachment 10 can be used in conjunction with various food processing devices 12 that can include, but are not limited to, standing mixers, food processors, manually operating processing devices, and other similar food processing devices 12.

According to the various embodiments, it is contemplated that the tension setting mechanism 160 of the sheeting attachment 10 can be adapted for adjustment to set the amount of blade pressure needed for processing a particular food or adjusting a cut thickness of the blade 18 in processing the food item 16. As discussed above, by adjusting the position of the adjustment handle 162 of the tension setting mechanism 160, multiple spring forces can be achieved through use of a single spring 150 or other biasing mechanism 100.

As discussed above, the plurality of radial flanges 36 are discontinuous of one other. This discontinuous relationship serves to allow better structural cohesiveness of the food to prevent breakage, shredding, or other unwanted deformation of the food during use of the sheeting attachment 10. As discussed above, greater surfacing area is achieved through using the soft-food holder 114 with a soft food item 16. The inclusion of the shield 116 which has a greater diameter than the base 28 of the hard food holder 112 provides a greater surface area for engaging the food item 16 within the processing space 38.

According to the various embodiments, the sheeting attachment 10 can include various adjustment mechanisms and tension setting mechanism 160 that allows for a desired blade pressure for a wide variety of food types and food diameters. Accordingly, the use of the sheeting attachment 10 provides for a substantially consistent biasing force 66 being exerted by the blade 18 onto the food item 16 such that the force applied against an outer surface 64 of a food item 16 having a large diameter is consistent from the initial cutting position 62 through the entire processing phase and to the stopping position 68. Accordingly, a substantially consistent thickness of the food sheet can be achieved during use of the sheeting attachment 10. Additionally, the use of the sheeting attachment 10 allows for a substantially hands-free experience such that the user can manipulate various adjustment mechanisms and is able to turn on the food processing device 12 and allow the sheeting attachments 10 to consistently manipulate and process the food item 16 as desired in a consistent manner through the entire processing function.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length 110 or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processing attachment for a food processing device, the food processing attachment comprising:
    a rotational adapter configured to be selectively coupled with a drive system of the food processing device;
    a food holder selectively rotated by the rotational adapter to define a processing space;
    a plurality of radial flanges extending perpendicularly from the food holder, each radial flange of the plurality of radial flanges being discontinuous with the other radial flanges;
    a frame that at least partially surrounds the rotational adapter and the food holder; and
    a blade coupled to an operable carriage, the blade adapted to selectively move through the processing space defined proximate the food holder, the blade being biased by the operable carriage toward the processing space, wherein the blade is operable from a rest position distal from the processing space, an initial cutting position defined by the blade entering into the processing space, and a stopping position defined by the operable carriage engaging at least one of the frame and the food holder, wherein the stopping position prevents further movement of the blade through the processing space;
    wherein the operable carriage is guided along a linear path between the rest, initial cutting and stopping positions by a linear guide that extends between the frame and the operable carriage, the linear guide adapted to prevent movement of the operable carriage distal from the linear path.

2. The food processing attachment of claim 1, wherein the frame extends to a food guide that opposes the food holder and further defines the processing space.

3. The food processing attachment of claim 1, wherein the linear guide includes at least one guide shaft that extends through a corresponding aperture defined within the operable carriage.

4. The food processing attachment of claim 1 wherein the linear guide includes a plurality of guide shafts that extend through corresponding apertures in the operable carriage.

5. The food processing attachment of claim 1, wherein the blade includes a planing blade that processes a food item into one or more food sheets of a substantially consistent thickness.

6. The food processing attachment of claim 1, wherein a biasing mechanism of the operable carriage exerts a biasing force that biases the blade toward the processing space.

7. The food processing attachment of claim 6, wherein the biasing mechanism is a low-rate spring.

8. A food processing attachment for a food processing device, the food processing attachment comprising:
    a rotational adapter configured to be selectively coupled with a drive system of the food processing device;
    a food holder selectively rotated by the rotational adapter to define a processing space;
    a frame that at least partially surrounds the rotational adapter and the food holder; and
    a blade coupled to an operable carriage, the blade adapted to selectively move through the processing space defined proximate the food holder, the blade being biased by the operable carriage toward the processing space, wherein the blade is operable from a rest position distal from the processing space, an initial cutting position defined by the blade entering into the processing space, and a stopping position defined by the operable carriage engaging at least one of the frame and the food holder, wherein the stopping position prevents further movement of the blade through the processing space;
    wherein the operable carriage is guided along a linear path between the rest, initial cutting and stopping positions by a linear guide that extends between the frame and the operable carriage, the linear guide adapted to prevent movement of the operable carriage distal from the linear path.

9. The food processing attachment of claim 8, wherein the frame includes a U-shaped portion that extends to a food guide that opposes the food holder and further defines the processing space.

10. The food processing attachment of claim 8, wherein the blade includes a planing blade that processes a food item into one or more food sheets of a substantially consistent thickness.

11. The food processing attachment of claim 8, wherein a biasing mechanism of the operable carriage exerts a biasing force that biases the blade toward the processing space.

* * * * *